(12) United States Patent
Nieratschker et al.

(10) Patent No.: US 10,195,747 B1
(45) Date of Patent: Feb. 5, 2019

(54) MULTI-FACED APPARATUS AND SYSTEM FOR AUTOMATED HANDLING OF COMPONENTS

(71) Applicant: General Electric Company, Schenectady, NY (US)

(72) Inventors: Anja Lena Nieratschker, Munich (DE); Sultan Shair, Ismaning (DE); Martin Petersen, Poing (DE); Stefaan Guido Van Nieuwenhove, Hohenkammer (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/668,126

(22) Filed: Aug. 3, 2017

(51) Int. Cl.
*B25J 15/06* (2006.01)
*B25J 15/00* (2006.01)

(52) U.S. Cl.
CPC ....... *B25J 15/0616* (2013.01); *B25J 15/0683* (2013.01); *B25J 15/0057* (2013.01)

(58) Field of Classification Search
CPC ............... B25J 15/0052; B25J 15/0057; B25J 15/0061; B25J 15/0616; B25J 15/0683; B25J 15/0691; B66C 1/0243; B66C 1/0237; B66C 1/0281; B66C 1/0287
USPC .................................. 294/183, 188, 189, 65
See application file for complete search history.

(56) References Cited

U.S. PATENT DOCUMENTS

| | | | |
|---|---|---|---|
| 3,591,227 A * | 7/1971 | Creskoff | B65G 47/91 294/65 |
| 4,931,341 A * | 6/1990 | Haffer | B65G 47/91 209/905 |
| 5,611,585 A * | 3/1997 | Lingen | B66C 1/0231 294/189 |
| 6,129,031 A | 10/2000 | Sarh et al. | |
| 7,296,834 B2 * | 11/2007 | Clark | B25J 15/0616 294/65 |
| 7,785,433 B2 | 8/2010 | Kisch et al. | |
| 7,950,708 B2 | 5/2011 | Parnell | |

(Continued)

FOREIGN PATENT DOCUMENTS

| | | |
|---|---|---|
| CA | 2291927 A1 | 4/2001 |
| CN | 101386223 A | 3/2009 |

(Continued)

OTHER PUBLICATIONS

U.S. Appl. No. 15/387,750, filed Dec. 22, 2016.
U.S. Appl. No. 15/163,096, filed May 24, 2016.
U.S. Appl. No. 15/163,172, filed May 24, 2016.

*Primary Examiner* — Dean J Kramer
(74) *Attorney, Agent, or Firm* — General Electric Company; Brian Overbeck

(57) ABSTRACT

An end effector is provided that includes a vacuum source and a plurality of gripping surfaces with each gripping surface including a plurality of vacuum zones having a non-smooth portion for distributing a vacuum, and a plurality of openings defined over the non-smooth portion for distributing the vacuum on the gripping surface using the vacuum source. The plurality of gripping surfaces is generally arranged in a polygonal shape. The plurality of vacuum zones are generally configured to grip cut-outs having a plurality of shapes. Methods are also provided for removing a cut-out from a sheet of material using an end effector having a plurality of gripping surfaces.

18 Claims, 7 Drawing Sheets

(56) References Cited

U.S. PATENT DOCUMENTS

| | | | |
|---|---|---|---|
| 8,256,484 B2 | 9/2012 | Kisch et al. | |
| 8,556,617 B2 * | 10/2013 | Reinhold | B25J 15/0052 |
| | | | 156/232 |
| 8,868,231 B2 * | 10/2014 | Moore | B25J 9/0084 |
| | | | 209/1 |
| 8,920,103 B2 * | 12/2014 | Schaller | H01L 21/67736 |
| | | | 318/568.12 |
| 8,960,750 B2 * | 2/2015 | Gong | B25J 15/0057 |
| | | | 294/188 |
| 9,010,827 B2 * | 4/2015 | Regan | B25J 15/0675 |
| | | | 294/188 |
| 9,334,066 B2 | 5/2016 | Tapia et al. | |
| 9,555,550 B2 * | 1/2017 | Eisele | B25J 15/0033 |
| 2006/0157997 A1 * | 7/2006 | Meredith | B65B 35/38 |
| | | | 294/65 |
| 2008/0089772 A1 | 4/2008 | Mueller-Hummel | |
| 2010/0239408 A1 * | 9/2010 | Becker | B65G 47/914 |
| | | | 414/800 |
| 2012/0330453 A1 | 12/2012 | Samak Sangari et al. | |
| 2015/0239131 A1 * | 8/2015 | Didiot | B25J 15/0683 |
| | | | 53/203 |
| 2016/0332837 A1 * | 11/2016 | Richards | B65H 29/241 |

FOREIGN PATENT DOCUMENTS

| | | | | |
|---|---|---|---|---|
| DE | 102007062534 A1 * | 6/2009 | | B25J 15/0052 |
| JP | H11233457 A | 8/1999 | | |

* cited by examiner

MULTI-FACED APPARATUS AND SYSTEM FOR AUTOMATED HANDLING OF COMPONENTS

FIELD

The present subject matter relates generally to automated manufacturing processes. More particularly, the present subject matter relates to apparatus adaptable for handling relatively thin components of a variety of shapes.

BACKGROUND

Composite materials are more commonly being used for fabrication of a wide variety of components. For example, carbon fiber composites have high strength and a low weight, making carbon fiber composites attractive for use in aviation applications that require these functionalities. As another example, ceramic matrix composite (CMC) materials can withstand relatively extreme temperatures; accordingly, there is particular interest in replacing components within a combustion gas flow path of a gas turbine engine with components made from CMC materials. Many composite materials, such as carbon fiber and CMC materials, are formed from plies, and the plies may be laid up to form a preform component that may then undergo various processing cycles to arrive at a component made from the composite material.

Typically, composite components made from plies comprise many plies. Each ply is cut from a sheet of (e.g., textile material) and then the cut plies are laid up to form one or more ply stacks that form the component preform. As used herein, a stack or ply stack describes more than one plies placed on each other. Often, the cut plies are manually removed from the sheet and manually placed in a ply storage area or manually stacked. Similarly, components for use in other applications, such as automotive, electronics, and telecommunications applications, may be formed from many stacked cut-outs, which are segments cut from relatively thin materials and may be manually manipulated. Thus, the handling and forming of preforms or cut-out stacks is a time consuming and labor intensive process, which increases the cost of the components.

Automating the removal and storage or stacking of the preform process could reduce the part cost and cycle time, as well as reduce employee health concerns from the repetitive nature of ply removal and handling. However, several barriers must be overcome to automate the process of removing plies from the sheet of material and moving the plies either to a ply storage area or for stacking. For example, to maximize material usage and minimize material waste, a variety of ply shapes and sizes are nested within the sheet and then cut prior to removal. Therefore, an automated apparatus for removing the plies must be able to adapt to a variety of ply shapes. Also, the automated apparatus must be able to remove the ply from the nested plies without displacing the left-over or remaining sheet material. As another example, for large plies, the automated apparatus must be able to maintain the ply in a substantially straight or flat configuration as it is removed and moved to prevent damaging or distorting the ply as it is removed or moved.

Accordingly, an automated cut-out or ply manipulation apparatus that overcomes these and other barriers would be desirable. For example, an end effector for a robotic arm that can grip and remove one or more cut-outs or plies from a sheet of material would be beneficial. In particular, an end effector having a plurality of gripping surfaces such that the end effector may grip cut-outs or plies having a variety of shapes and/or sizes would be useful. Additionally, methods for removing cut-outs or plies using an end effector having a plurality of gripping surfaces would be helpful.

BRIEF DESCRIPTION

Aspects and advantages of the invention will be set forth in part in the following description, or may be obvious from the description, or may be learned through practice of the invention.

In one exemplary embodiment of the present subject matter, an end effector is generally provided that includes a vacuum source and a plurality of gripping surfaces with each gripping surface including a plurality of vacuum zones having a non-smooth portion for distributing a vacuum, and a plurality of openings defined over the non-smooth portion for distributing the vacuum on the gripping surface using the vacuum source. The plurality of gripping surfaces is generally arranged in a polygonal shape. The plurality of vacuum zones are generally configured to grip cut-outs having a plurality of shapes.

In another exemplary embodiment of the present subject matter, an end effector system is generally provided. The end effector system may include a cutting table on which a plurality of cut-outs is cut from a sheet of material; an automated machine; and an end effector attached to the automated machine. The end effector is generally may include a vacuum source and a plurality of gripping surfaces with each gripping surface including a plurality of vacuum zones having a non-smooth portion for distributing a vacuum, and a plurality of openings defined over the non-smooth portion for distributing the vacuum on the gripping surface using the vacuum source. The plurality of gripping surfaces is generally arranged in a polygonal shape. The plurality of vacuum zones are generally configured to grip cut-outs having a plurality of shapes.

In a further exemplary embodiment of the present subject matter, a method is generally provided for removing a cut-out from a sheet of material using an end effector having a plurality of gripping surfaces. The method may include orienting the end effector such that one gripping surface of the plurality of gripping surfaces is oriented toward the cut-out; bringing the one gripping surface oriented toward the cut-out into contact with the cut-out in the sheet of material; generating a vacuum on the one gripping surface with at least one vacuum zone of the one gripping surface to grip the cut-out; and removing the cut-out from the sheet of material. Each gripping surface may include a plurality of vacuum zones, each vacuum zone having a non-smooth portion, and a plurality of openings may be defined over the non-smooth portion for generating the vacuum on the gripping surface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
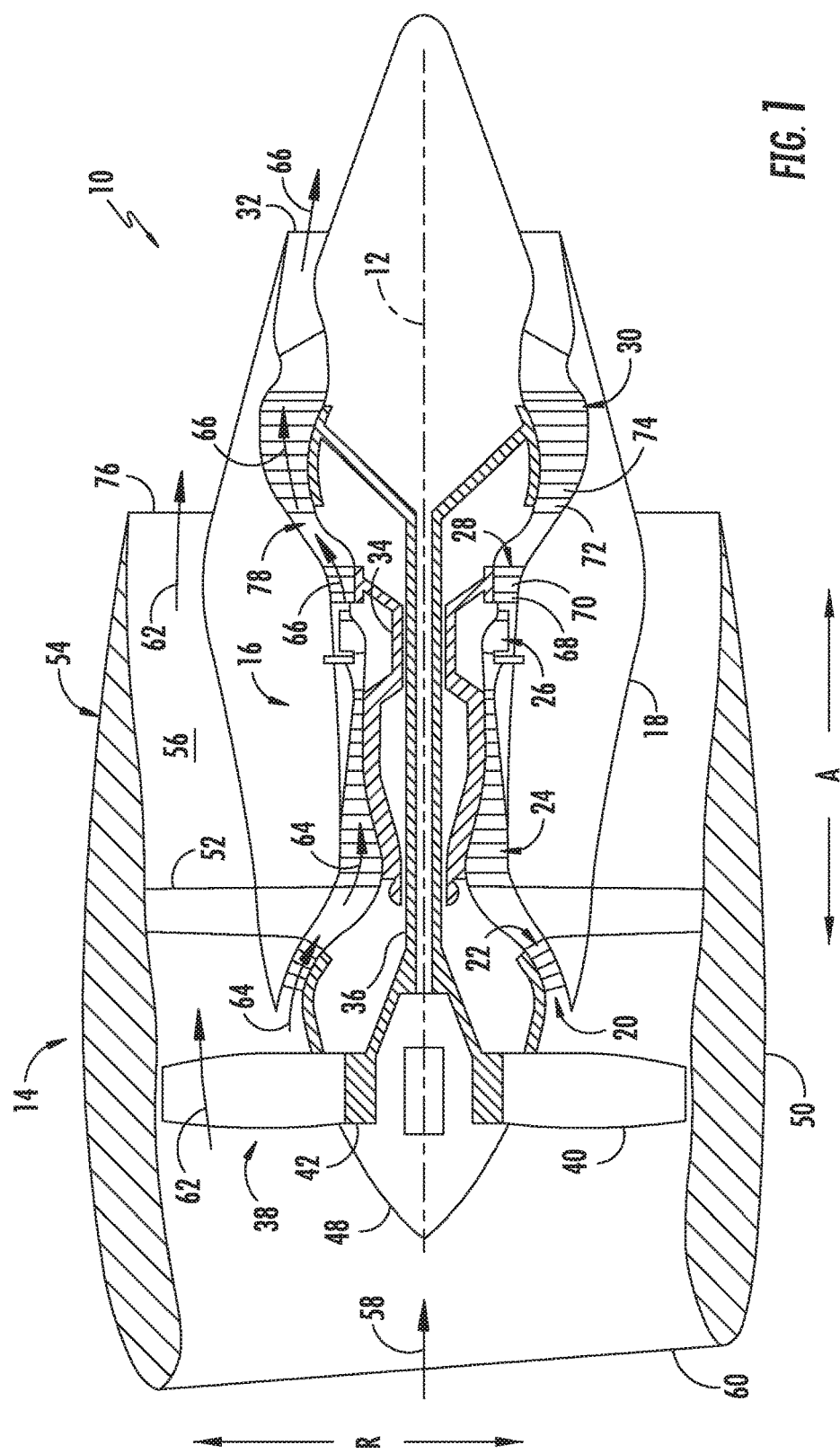
FIG. 1 provides a schematic cross-section view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of turbofan engine 10, particularly components within hot gas path 78, such as components of combustion section 26, HP turbine 28, or LP turbine 30, may comprise a ceramic matrix composite (CMC) material, a polymer matrix composite (PMC) material, or other suitable non-metallic material having high temperature capability. Composite materials generally comprise a fibrous reinforcement material embedded in matrix material, such as polymer or ceramic material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, or alumina matrix materials, or combinations thereof, and ceramic fibers embedded within the matrix material. Ceramic fibers may be embedded within the matrix, such as oxidation stable reinforcing fibers including monofilaments like sapphire and silicon carbide (e.g., Textron's SCS-6), as well as roving and yarn including silicon carbide (e.g., Nippon Carbon's NICALON®, Ube Industries' TYRANNO®, and Dow Corning's SYLRAIVIIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

Similarly, PMC materials are typically fabricated by impregnating a fabric or unidirectional tape with a resin (prepreg), followed by curing. Prior to impregnation, the fabric may be referred to as a "dry" fabric and typically comprises a stack of two or more fiber layers (plies). The fiber layers may be formed of a variety of materials, non-limiting examples of which include carbon (e.g., graphite), glass (e.g., fiberglass), polymer (e.g., Kevlar®) fibers, and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. PMC materials can be produced by dispersing dry fibers into a mold, and then flowing matrix material around the reinforcement fibers, or by using prepreg. For example, multiple layers of prepreg may be stacked to the proper thickness and orientation for the part, and then the resin may be cured and solidified to render a fiber reinforced composite part. Resins for PMC matrix materials can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins.

Additionally or alternatively, components of turbofan engine 10, such as fan 28, may comprise a carbon fiber composite material or another composite material. As discussed herein, such composite materials, e.g., CMC, carbon fiber, PMC, etc., are referred to generally as "composite materials" or "composites."

Thus, components made from composite materials may be formed from plies of a composite precursor material that are laid up to form a preform and then processed to produce the composite component. For example, the composite precursor material may be made as thin sheets, and plies may be cut from each sheet. Often, hundreds or thousands of plies are required to form one composite component. Typically, each ply is removed from the sheet of material manually, i.e., by human hands, and either manually moved to a ply storage area or moved to a ply layup area, where the plies are laid up to form the preform. Accordingly, an automated process for removing and moving the plies from the sheet of composite precursor material could help reduce fabrication time and cost and also may help reduce errors in the fabrication process.

Figure 2:
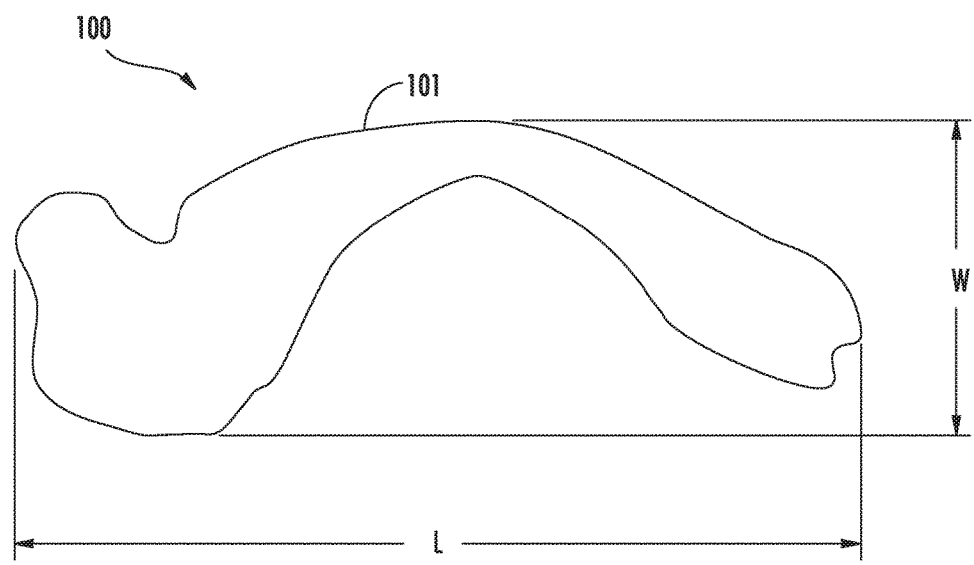
FIG. 2 provides a top view of an arbitrarily shaped cut-out cut from a sheet of material, according to an exemplary embodiment of the present subject matter.

Some composite components utilize plies that may be relatively large in size and/or may have an arbitrary shape. For example, plies may have a length that ranges from about 15 centimeters (cm) to about 300 cm and a width that ranges from about 4 cm to about 120 cm. As an example of a component, plies for forming a fan blade 40 of fan 38 may be up to about 150 cm (or 1.5 meters) in length. However, other sizes of plies may be used as well. Further, some plies may have generally geometric shapes, such as generally rectangular, circular, or other another geometric shape, but other plies may have arbitrary shapes. For instance, some plies may be generally non-geometric in shape and may, e.g., comprise one or more bends, curves, and/or angles. An exemplary arbitrarily shaped ply 100, having a length L, a width W, and an edge or perimeter 101, is illustrated in FIG. 2, but it will be appreciated that the plies 100 used to form a composite component may have any shape and/or size. Each ply 100 referred to herein has an arbitrary, or immaterial, shape and size. No matter the shape, the cutting forms, in one particular embodiment, a clean separation between the plies such that the pick up of one ply does not affect the adjacent ply.

Figure 3:
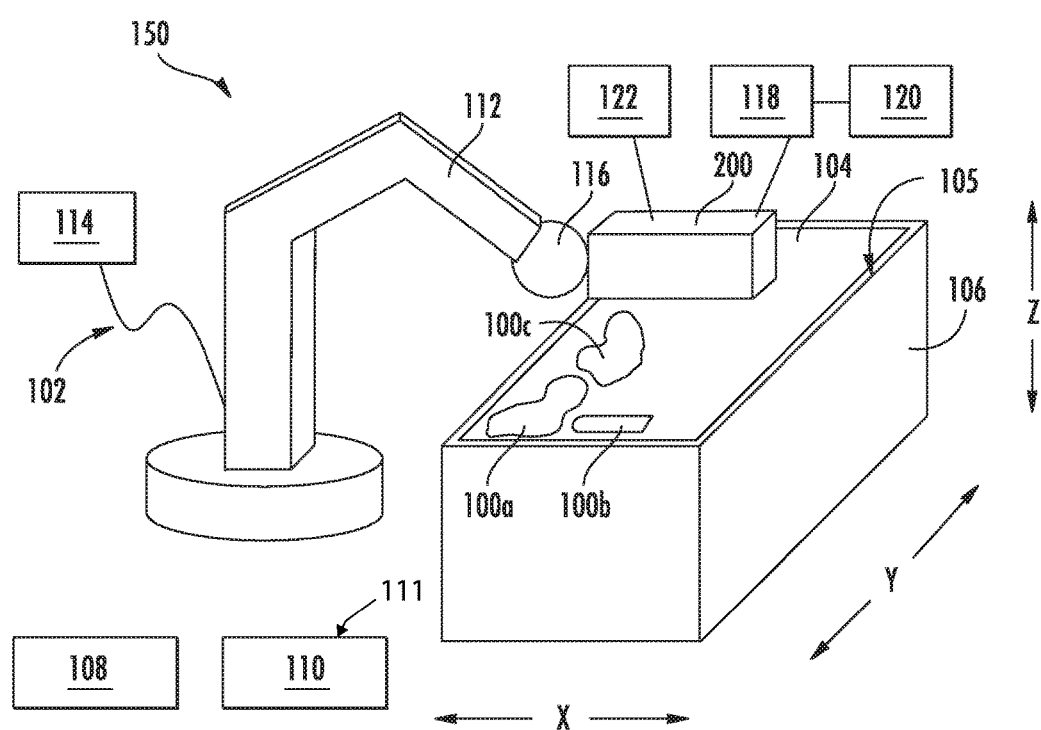
FIG. 3 provides a schematic view of an end effector system according to an exemplary embodiment of the present subject matter.

Referring to FIG. 3, an end effector system 150 may be used to manipulate cut-outs from a sheet of material, e.g., by removing the cut-outs from the sheet and transporting the cut-outs to a stacking or layup area. In exemplary embodiments of the present subject matter, one or more automated machines 102, such as robots or the like, are used to remove cut-outs 100, which are segments or pieces of a material that have been cut from a sheet 104 of the material that, e.g., is positioned on a cutting table 106. As described more fully herein, in exemplary embodiments, the sheet 104 of material may be relatively thin and non-rigid, such that the cut-outs 100 are relatively thin and non-rigid.

As illustrated in FIG. 3, a plurality of cut-outs 100 having a plurality of shapes, such as a first cut-out 100a, a second cut-out 100b, and a third cut-out 100c that have dissimilar shapes, may be cut from the sheet 104 of material. In a particular exemplary embodiment, the cut-outs 100 are plies 100 that have been cut from a sheet 104 of composite precursor material. The cutting table 106 may define a first horizontal direction X, a second horizontal direction Y that is perpendicular to the first horizontal direction X, and a vertical direction Z. A sheet 104 of material may be positioned on a top surface 105 of the table 106 such that the sheet 104 is generally planar, extending along the first horizontal direction X and the second horizontal direction Y. A plurality of plies 100 may be cut from the sheet 104, and then automated machine 102 may be used to remove the plies 100 from the sheet 104. As described herein, the automated machine 102 has one or more features such that the shape and/or size of each ply 100 is immaterial to the machine's ability to remove the plies 100 from the sheet 104; the machine 102 is configured to adapt to the shape and/or size of each ply 100 to remove the ply from the sheet. As such, the plies 100 may be referred to as arbitrarily shaped plies 100. After removing a ply 100 from the sheet 104 of material, the automated machine 102 may move the ply to a ply storage area 108, to a ply layup or stacking area 110, or to another suitable location away from the sheet 104. Thus, removing and moving plies cut from a sheet of material may be an automated process performed by one or more machines rather than a manual process performed by human hands.

In some embodiments, the sheet 104 of material is positioned on a cutting table 106 that places a vacuum on the sheet 104 to hold the sheet in place on the table. As such, a vacuum seal may be formed between the cutting table 106 and the cut-outs or plies 100 cut from the sheet 104 of material, which may increase the difficulty of removing the plies 100 from the sheet 104 and away from the cutting table 106. More particularly, the vacuum applied to the sheet 104 may remain on as a ply 100 is removed from the sheet, e.g., to hold the sheet 104 and/or remaining plies 100 in place on the table 106.

Further, it should be understood that, although described herein with respect to plies 100 for forming a composite component, the present subject matter is not limited to manipulation or handling of plies of composite precursor material. Moreover, the present subject matter is not limited in application to turbofan engines 10. Rather, the present subject matter also may be applicable to the handling of other thin objects, which may be formed from a variety of materials; may be rigid, flexible, or semi-rigid; and/or may be a finished component or an element of a finished component. For example, the present subject matter may be applicable to the handling of cut-outs of pre-impregnated (pre-preg) tapes, paper, film, foil, etc., that are cut from a sheet of the material. Such cut-outs may be used to produce components or component elements for automotive applications, laptop or personal computing devices, cellular telephones, other types of gas turbine engines (such as turboprop, industrial, or marine engines), other aviation applications (such as an airplane wing, fuselage, or the like), etc.

Figure 4:
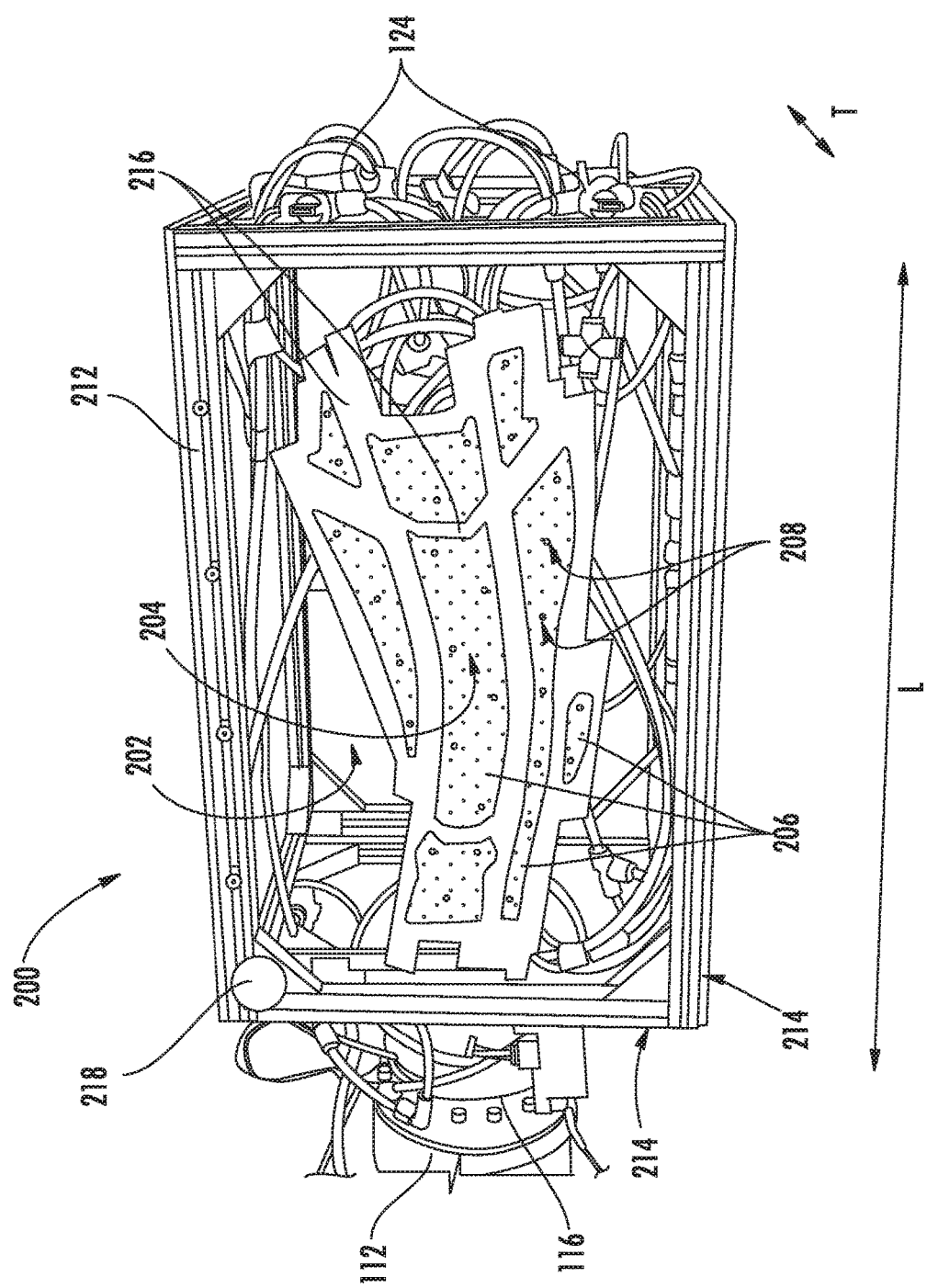
FIG. 4 provides a side view of an end effector according to an exemplary embodiment of the present subject matter.

Referring to FIG. 4, in one exemplary embodiment, an end effector 200 is received on a robotic arm 112 of an automated machine 102. It will be appreciated that the automated machine 102 may include any suitable control system for controlling the features of the machine without deviating from the scope of the present disclosure. For instance, automated machine 102 may have various suitable configurations and/or control circuitries for removing one or more cut-outs or plies 100 from a sheet 104 of material, moving one or more cut-outs or plies 100 to a suitable location, or performing any of the various operations described herein. In the schematic depiction of FIG. 3, for example, automated machine 102 includes an articulable robotic arm 112 and end effector 200 for removing and moving cut-outs or plies 100, but machine 102 may include any suitable features and components for performing the functions described herein. Further, although described herein with respect to an articulated or 6-axis industrial type robot, it should be appreciated that any suitable robot or automated machine 102 may be used as well. For example, dual arm robots, SCARA robots, Cartesian or gantry robots, parallel or delta robots, cylindrical robots, redundant robots, or the like, as well as mobile robots or manipulators, may be suitable for use with the subject matter described herein.

In one embodiment, automated machine 102 includes a control circuit having one or more processors 114 and associated memory device(s) configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) may generally be configured to store suitable computer-readable instructions that, when implemented by the processor(s) 114, configure the control circuit to perform various functions including, but not limited to, removing one or more cut-outs or plies 100 from the sheet 104 of material, moving the one or more cut-outs or plies 100 to a suitable location (e.g., a storage area or a layup or stacking area), establishing and controlling a vacuum along an end effector surface, controlling the position of an end effector and the orientation of an end effector surface, or other functions. More particularly, the instructions may configure the control circuit to perform functions such as receiving directly or indirectly signals from one or more sensors (e.g. voltage sensors, current sensors, and/or other sensors) indicative of various input conditions, and/or various other suitable computer-implemented functions, which enable the automated machine(s) 102 to carry out the various functions described herein. An interface can include one or more circuits, terminals, pins, contacts, conductors, or other components for sending and receiving control signals. Moreover, the control circuit may include a sensor interface (e.g., one or more analog-to-digital converters) to permit signals transmitted from any sensors within the system to be converted into signals that can be understood and processed by the processor(s) 114.

FIG. 4 provides a side view of an end effector 200 according to an exemplary embodiment of the present subject matter. The end effector 200 defines a longitudinal direction L, a transverse direction T, and a vertical direction V, which are orthogonal to one another. The end effector 200 includes a plurality of gripping surfaces 202 generally arranged in a polygonal shape. For instance, in the embodiment illustrated in FIG. 4, the end effector 200 comprises four gripping surfaces 202 that form four faces of a cuboid. More particularly, the gripping surfaces 202 of the depicted exemplary end effector 200 are the rectangular side faces of the cuboid, while the two square end faces of the cuboid provide a surface for attaching the end effector, e.g., to robotic arm 112, and an area for the collection of or to provide room for other components of the end effector. In other embodiments, however, every face of the end effector 200 may comprise a gripping surface 202, and/or the end effector 200 may comprise fewer or more than four gripping surfaces 202. Further, as depicted in FIG. 4, each gripping surface 202 is substantially planar. The gripping surfaces 202 may be made from Plexiglas®, another plastic material, a metallic material, or any other suitable material. Preferably, each gripping surface 202 is sufficiently flexible to adapt to a contour of a surface against which the gripping surface is positioned. For example, as further described herein, a gripping surface 202 gripping a cut-out 100 may be positioned against a stacking surface on which the cut-out 100 is to be deposited. The stacking surface may have a contour that is non-planar, and while the exemplary gripping surface 202 generally is planar, the gripping surface also has enough flexibility to adapt to the contour of the stacking surface such that the gripping surface 202 contacts the stacking surface as the cut-out 100 is deposited on the stacking surface.

Continuing with FIG. 4, each gripping surface 202 includes a plurality of vacuum zones 206, and each vacuum zone 206 includes a non-smooth portion 204. A plurality of openings 208 are defined over the non-smooth portion 204 for generating a vacuum on the gripping surface 202 using a vacuum source 118. The vacuum source 118 may be, e.g., a pump or other suitable device for generating a vacuum, and the end effector system 150 may include a vacuum control unit 120 for controlling a vacuum level of the vacuum source 118, as well as a vacuum sensor 122 for detecting the vacuum level of the vacuum source 118. The vacuum sensor 122 may be positioned on the automated machine 102, e.g., on the robotic arm 112. Alternatively, the vacuum sensor 122 may be positioned on or within the end effector 200 or away from the automated machine and/or end effector 200, e.g., at or near the vacuum control unit 120. In other embodiments, the end effector system 150 may include a plurality of vacuum sensors 122 that are positioned at various locations within the system, such as on the automated machine 102 as well as the end effector 200 and vacuum control unit 120. The end effector system 150 and/or end effector 200 also may include one or more valves 124 for controlling the vacuum level of the vacuum generated on the gripping surfaces 202. Moreover, in embodiments of the end effector system 150 utilizing a vacuum cutting table 106, it will be appreciated that the vacuum generated on the gripping surface 202 is sufficient to overcome the vacuum applied to the sheet 104 and lift the cut-outs 100 from the sheet 104 and cutting table 106. Further, the vacuum is sufficient for the end effector 200 to firmly hold the cut-outs 100 and to keep the cut-outs 100 substantially flat.

A frame 212 extends about the perimeter of each gripping surface 202, or generally along the edges 214 of the end effector 200. The frame 212, for example, helps hold the plurality of gripping surfaces 202 in position with respect to one another and support various features of the end effector 200, such as tubing, valves, and the like for generating a vacuum on the gripping surfaces 202. Additionally, the frame 212 may stabilize the gripping surfaces 212 as they are flexible to adapt to the plies. As illustrated in FIG. 4, the frame 212 defines a perimeter of the end effector 200, but in other embodiments, the frame 212 may have a different configuration, i.e., the frame 212 may not extend about or define the perimeter of the end effector 200 but, for example, may extend between gripping surfaces 202 within an interior of the end effector 200. The frame 212 may have any suitable shape, e.g., a square, rectangular, or other polygonal or appropriate shape, for supporting and/or providing an attachment structure for the various components of the end effector 200.

The textured or non-smooth portion 204 may be laser engraved, etched, or otherwise manufactured into a square, diamond, circular, honeycomb, or other pattern. The non-smooth portion 204 is a generally rough or not smooth area of the gripping surface, while the remainder of the gripping surface 202 is substantially smooth. The non-smooth or textured area comprises a pattern that is defined to an extent to sufficiently delineate the non-smooth area of the gripping surface 202 but without imprinting the cut-out 100 when the cut-out is gripped against the non-smooth portion 204 by the vacuum. That is, the pattern is not so finely defined that the pattern is imprinted on the cut-out 100 by the force of the vacuum holding the cut-out to the gripping surface 202, but the pattern of the non-smooth portion 204 is sufficiently defined to differentiate the non-smooth portion 204 from the remainder of the gripping surface 202 and to distribute the vacuum. More particularly, the non-smooth portion 204 helps distribute the vacuum over its area and the vacuum zone 206, which may help minimize the number of openings needed to generate the vacuum on the gripping surface 202. It will be appreciated that the non-smooth portion 204 of each vacuum zone 206 need not extend over the entire vacuum zone 206, but the non-smooth portion 204 extends between each opening 208 of the vacuum zone 206 to distribute the vacuum within the vacuum zone. However, in exemplary embodiments, the entire vacuum zone 206 may be non-smooth or textured, e.g., to distribute the vacuum over the entire area of the vacuum zone 206. That is, the non-smooth portion 204 may comprise the entire area of the vacuum zone 206 to help distribute the vacuum over the vacuum zone area.

As previously stated, each gripping surface 202 is divided into a plurality of vacuum zones 206. The vacuum zones 206 are configured to grip cut-outs or plies 100 having a plurality of shapes. More specifically, each vacuum zone 206 is configured to be independently activated, e.g., to adapt the vacuum generated on the gripping surface 202 to the shape each cut-out 100, which may have arbitrary or immaterial shapes as described above. As shown in FIG. 4, a seal 216 extends around a perimeter of each vacuum zone 206. The seal 216 helps establish each vacuum zone 206, i.e., the seal 216 delineates the separate vacuum zones 206. The seal 216 also provides sealing between the cut-out 100 and the end effector 200; that is, the seal 216 seals against ambient pressure to help establish the vacuum between the cut-out 100 and the gripping surface 202 of the end effector 200. In one embodiment, the use of different vacuum zones 206, separated by seal 216, allows for the use of one zone without loss of vacuum therein, while also preventing adjacent zones from picking up unwanted areas (e.g., adjacent plies to the targeted zone). The seal 216 may be formed by layers of insulation tape or any other appropriate material.

Figure 5A:
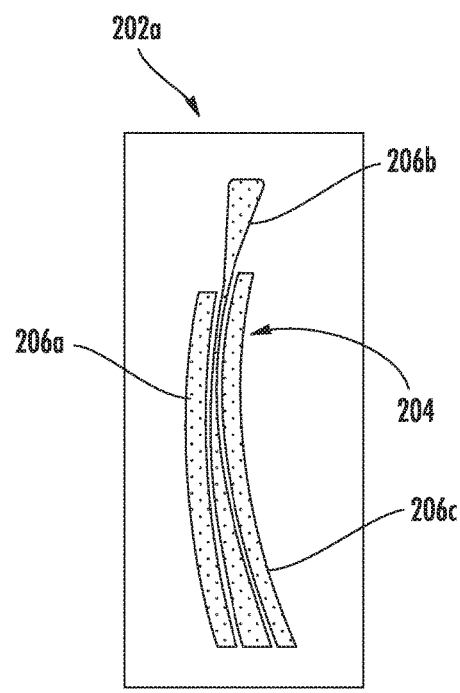
FIGS. 5A through 5D provide schematic views of gripping surfaces of the end effector of FIG. 4 according to various embodiments of the present subject matter.
Figure 5B:
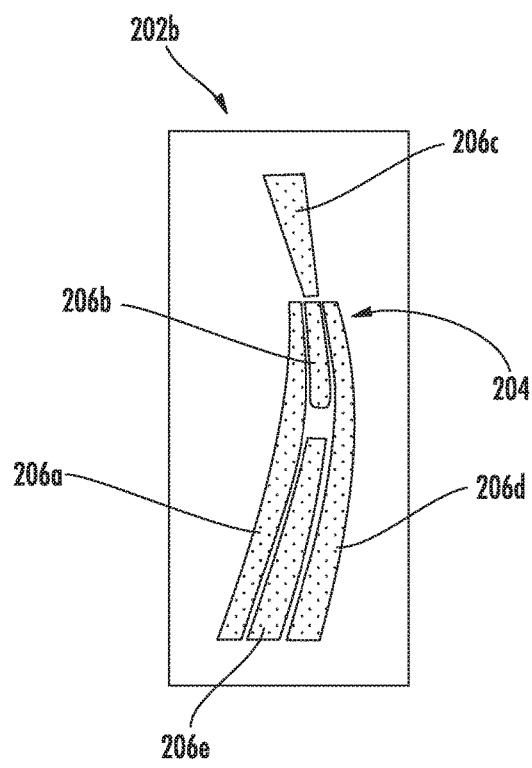
Figure 5C:
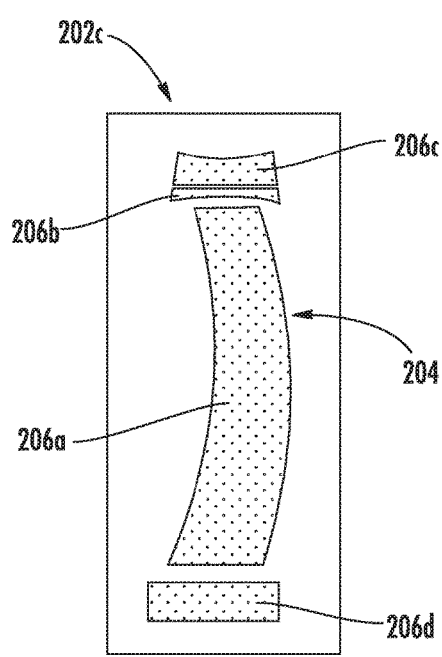
Figure 5D:
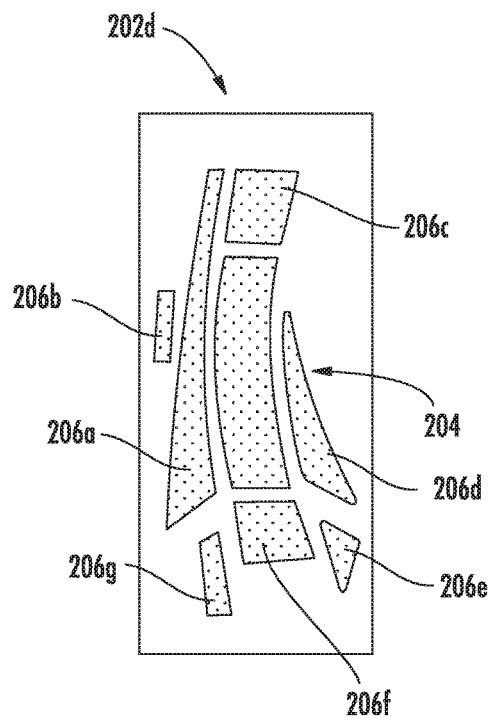

Referring to FIGS. 5A through 5D, the vacuum zones 206 of each gripping surface 202 may vary in shape among the plurality of gripping surfaces 202. Further, the number of vacuum zones 206 also may vary among the plurality of gripping surfaces 202. In an exemplary embodiment of the present subject matter, FIG. 5A illustrates a first gripping surface 202a of the end effector 200, FIG. 5B illustrates a second gripping surface 202b, FIG. 5C illustrates a third gripping surface 202c, and FIG. 5D illustrates a fourth gripping surface 202d. As shown in FIGS. 5A through 5D, each gripping surface 202 may have vacuum zones 206 of different shapes, as well as a different number of vacuum zones 206. As such, each gripping surface 202 is configured to grip cut-outs or plies 100 having a plurality of shapes, as described in greater detail herein. Further, the plurality of gripping surfaces 202 and vacuum zones 206 allow the end effector 200 to simultaneously grip more than one cut-out or ply 100, and the cut-outs or plies 100 simultaneously gripped by the end effector 200 may have different shapes.

In exemplary embodiments, each of the vacuum zones 206 may be individually controlled such that the vacuum zones 206 may be selectively utilized in removing cut-outs 100 from the sheet 104 of material. That is, not every vacuum zone 206 need be used to remove a particular cut-out 100 from the sheet. For example, as illustrated in FIG. 5A, the first gripping surface 202a may comprise three vacuum zones 206a, 206b, 206c. The first vacuum zone 206a may be activated to grip cut-outs 100 having a shape and/or size within a first range of shapes and/or sizes, the second vacuum zone 206b may be activated to grip cut-outs 100 having a shape and/or size within a second range of shapes and/or sizes, and the third vacuum zone 206c may be activated to grip cut-outs 100 having a shape and/or size within a third range of shapes and/or sizes. The first and second vacuum zones 206a, 206b may be activated simultaneously to grip cut-outs 100 having a shape and/or size within a fourth range of shapes and/or sizes, the first and third vacuum zones 206a, 206c may be activated simultaneously to grip cut-outs 100 having a shape and/or size within a fifth range of shapes and/or sizes, and the second and third vacuum zones 206b, 206c may be activated simultaneously to grip cut-outs 100 having a shape and/or size within a sixth range of shapes and/or sizes. All three vacuum zones 206a, 206b, 206c may be activated simultaneously to grip cut-outs 100 having a shape and/or size within a seventh range of shapes and/or sizes. Thus, each of the plurality of vacuum zones 206 of a gripping surface 202 may be selectively activated such that an appropriate number of vacuum zones 206 are used for a particular cut-out or ply configuration.

Additionally, the end effector 200 includes features for releasing cut-out or ply 100 that is gripped by the vacuum generated over a gripping surface 202 from the vacuum. For instance, pressurized air or other non-mechanical means may be used to release the cut-out 100 from the end effector 200. As another example, a vacuum release valve may be included to release the vacuum of the gripping surface 202. In other embodiments, one or more mechanical devices may separate the cut-out 100 from the end effector 200. The mechanical device or devices may be a part of end effector 200 or may be separate from the end effector.

In some embodiments, the processor 114 may automatically control the position and/or orientation of the end effector 200. For instance, referring to the embodiment of FIGS. 3 and 4, a cut-out removal pattern may be pre-programmed such that processor 114 stores the position and orientation of the end effector 200 for removing the first cut-out 100a, the position and orientation of the end effector 200 for removing the second cut-out 100b, the position and orientation of the end effector 200 for removing the third cut-out 100c, and so on for each cut-out or ply 100 to be removed from the sheet 104 of material. The position of the end effector 200 generally refers to the location of the end effector with respect to the sheet 104, e.g., the location of the end effector 200 in the X-Y plane of FIG. 3. The orientation of the end effector 200 generally refers to which gripping surface 202 is oriented toward or facing the sheet 104, e.g., whether the first, second, third, or fourth gripping surface 202a, 202b, 202c, 202d is oriented toward the sheet 104.

Thus, the processor 114 may automatically vary the X-Y location of the end effector 200 and the gripping surface 202 facing the sheet 104 such that a particular vacuum zone 206 or group of vacuum zones 206 is positioned over the sheet 104 to pick up a particular cut-out 100. For example, the end effector 200 may be positioned parallel with the sheet 104 and the table to ensure complete pick-up. Further, using the pre-programmed positions and orientations of the end effector 200, the processor 114 can control an actuator or other device to reposition and/or reorient the end effector 200 between when the end effector 200 releases one cut-out 100 and is located over the sheet 104 to pick up the next cut-out 100.

Moreover, in some embodiments, the end effector 200 may include one or more sensors 218 that, e.g., sense and provide inputs to the processor 114 regarding the relative position of each cut-out 100 cut in sheet 104. For example, a sensor 218 may be positioned on each gripping surface 202, or on frame 212 adjacent gripping surfaces 202, and each sensor 218 may provide inputs to processor 114 regarding the shapes of the cut-outs 100, the location of a cut-out 100 relative to an edge of the sheet 104 of material or another reference point, or the like. Suitable sensors 218 may include edge sensors, laser distance sensors, color sensors, optical sensors (such as cameras), or any other appropriate sensor. The processor 114 may then use the inputs from each sensor 218 to control the position and orientation of the end effector 200 according to, e.g., the shape and location of a cut-out 100. It will be appreciated that the processor 114 includes any appropriate memory device(s), sensor interface(s), subsystem(s), etc., such as a camera image processing subsystem or the like, for using the inputs from the one or more sensors 218 to control the end effector 200.

Thus, the processor 114 may automatically control the end effector 200 to reposition and/or reorient the end effector 200 for gripping the next cut-out 100 to be picked up. Such automatic control of the end effector 200 positions may help reduce the time required to remove cut-outs 100 from a sheet 104 of material because, e.g., the processor can reposition and/or reorient the end effector 200 for picking up the next cut-out 100 as the end effector 200 is moving to pick up the next cut-out. Accordingly, by the time the end effector 200 is in place to pick up the next cut-out 100, an appropriate gripping surface 202 is in position to engage the next cut-out. In some embodiments, multiple cut-out removal patterns may be pre-programmed into the processor 114 or, alternatively, the positions and/or orientations of the end effector 200 may be sent to the processor 114, e.g., by an operator or based on inputs from one or more sensors 218, substantially in real time. Of course, the processor 114 may control the end effector 200 in other ways as well.

As shown in FIGS. 3 and 4, the end effector 200 is attached to a robotic arm 112 of the automated machine 102 via a flange 116. For example, the frame 212 of the end effector 200 may be coupled to the flange 116 to attach the end effector 200 to the robotic arm 112. The flange 116 allows the end effector 200 to rotate about the robotic arm 112. That is, the processor 114 of the automated machine 102 may send one or more signals to an actuator 228 to control the angular position of the end effector 200 with respect to the robotic arm 112 by varying the position of the flange 116. For example, the flange 116 may rotate with respect to the arm 112, thereby changing the angular position of the end effector 200 attached to the flange 116 with respect to the arm 112. As a particular example, the flange 116 may rotate with respect to the arm 112 to change which gripping surface 202 is oriented toward or facing the sheet 104 of material from which cut-outs 100 are to be removed. Moreover, the robotic arm 112 may control the longitudinal, lateral, and vertical location or position of the end effector 200 with respect to the sheet 104 and the cut-outs or plies 100 to be removed from the sheet 104. As described above, the processor 114 may automatically control the actuator 228 to reposition and/or reorient the end effector 200 with respect to the robotic arm 112 according to a pre-programmed cut-out removal pattern. In other embodiments, one or more sensors 218 may be provided such that processor 114 may automatically control the actuator 228 to reposition or adapt the position of end effector 200 according to one or more inputs from the sensor(s) 218, e.g., substantially in real time.

Figure 6:
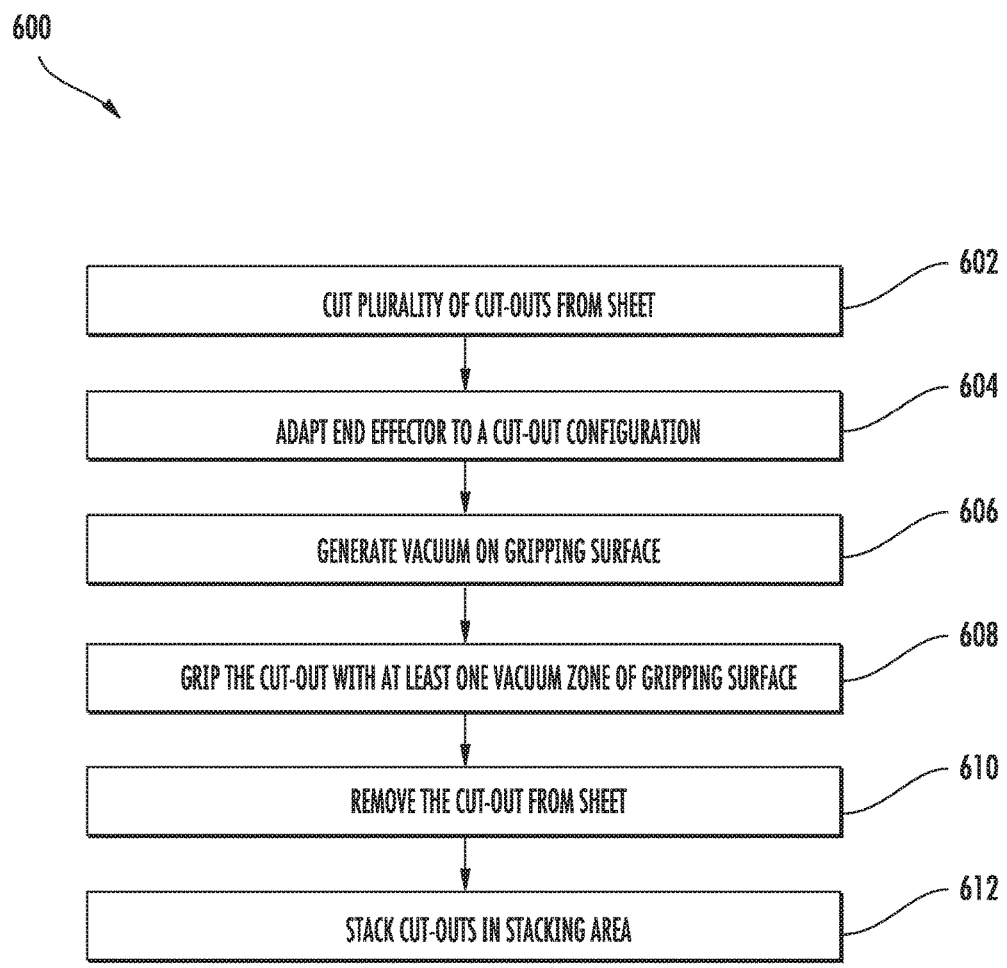
FIG. 6 provides a flow diagram of a method for removing a cut-out from a sheet of material using the end effector of FIG. 4, according to an exemplary embodiment of the present subject matter.

Turning to FIG. 6, the present subject matter also provides methods for removing one or more cut-outs from a sheet of material using an end effector as described above. In an exemplary embodiment, a method 600 is provided for removing a cut-out 100 from a sheet 104 of material using an end effector 200 having a plurality of gripping surfaces 202. The end effector 200 is attached to an automated machine 102 that comprises a processor 114 for controlling the end effector 200.

The method 600 comprises cutting from the sheet 104 of material a plurality of cut-outs 100 having a plurality of configurations, i.e., a plurality of shapes and sizes, as shown at 602 in FIG. 6. The sheet 104 is supported on a cutting table 106, which may be a vacuum cutting table 106 as described above. The method 600 further includes, as shown at 604 in FIG. 6, orienting the end effector 200 such that one gripping surface 202 of the plurality of gripping surfaces 202 is oriented toward a cut-out 100. As previously described, the processor 114 may be configured to automatically adapt the position and/or orientation of the end effector 200 such that a particular gripping surface 202 is oriented toward and located at a particular cut-out 100 for gripping that cut-out 100.

Additionally, as shown at 606 in FIG. 6, the method 600 includes bringing the end effector 200 into contact with the cut-out 100 in the sheet 104 of material. Then, as shown at 608, the method 600 includes generating a vacuum between the gripping surface 202 and the cut-out 100 to be removed from the sheet 104. The vacuum is generated by activating the vacuum source 118, e.g., by activating the vacuum pump or other vacuum generating device, which establishes a vacuum through the openings 208 defined in the non-smooth portion 204 of the gripping surface 202. Further, the vacuum may be generated in one or more vacuum zones 206 of the gripping surface 202 oriented toward the cut-out 100 to be removed. That is, depending on the configuration of the cut-out 100 to be removed from the sheet 104 of material, certain vacuum zones 206 may be activated while other vacuum zones 206 are not activated. As described above, the non-smooth portion 204 of the gripping surface 202 helps distribute the vacuum across the vacuum zones 206 using a minimum number of openings 208. In an exemplary embodiment, the processor 114, using one or more sensors 218, senses the shape and/or size of the cut-out 100 in the sheet 104 and activates the vacuum zones 206 needed to remove the cut-out 100 having the sensed shape and/or size from the sheet 104, without lifting skeleton, i.e., left-over or remaining, material of the sheet 104 with the cut-out 100.

The end effector 200, i.e., the gripping surface 202, remains in contact with the cut-out 100 until a sufficient vacuum builds up between the end effector 200 and the cut-out 100 for the end effector 200 to remove the cut-out 100 from the sheet 104. The vacuum is sufficient to firmly hold the cut-out 100 to the gripping surface 202, and the substantially planar gripping surface 202 keeps the cut-out 100 substantially flat as it is held by the end effector 200. Further, the contact between the gripping surface 202 of the end effector 200 and the cut-out 100 as the vacuum builds helps prevent shifting of the cut-out 100 with respect to the gripping surface 202, which may help ensure the cut-out 100 is removed from the sheet 104 without deformation of the cut-out 100.

Once the cut-out 100 is gripped by the end effector 200, the cut-out 100 is removed from the sheet 104 of material, as shown at 610 in FIG. 6. The cut-out 100 is removed by raising the end effector 200 away from the sheet 104. As previously described, the vacuum generated by the activated vacuum zones 206 is sufficient to remove the cut-out 100 without removing skeleton material of the sheet 104. Further, it will be appreciated that the end effector 200 may maintain the position and orientation of the cut-out 100 as it is removed from the sheet 104. Moreover, because the end effector 200 maintains a continuous vacuum connection along the cut-out 100, the end effector 200 keeps cut-out 100 stable as it is removed and transported from the sheet 104.

Of course, the end effector 200 also may grip two cut-outs 100 simultaneously. In some embodiments, after removing one cut-out 100 (e.g., first cut-out 100a) from the sheet 104 of material using one gripping surface 202 (e.g., first gripping surface 202a), the end effector 200 may rotate to orient another gripping surface 202 (e.g., second gripping surface 202b) toward the sheet 104 and another cut-out 100 (e.g., second cut-out 100b). The second gripping surface 202b of the end effector 200 is then lowered into contact with the second cut-out 100b, and a vacuum may be generated on the second gripping surface 202b, e.g., by activating one or more vacuum zones 206 of the second gripping surface 202b as previously described. The end effector 200 then grips the cut-out 100b and is raised away from the sheet 104 to remove the cut-out 100b. It will be understood that the vacuum is maintained on the first gripping surface 202a such that the end effector 200 continues gripping the first cut-out 100a as it grips the second cut-out 100b. Further, the end effector 200 may continue to be rotated, e.g., as controlled by processor 114, to grip other cut-outs 100 simultaneously with the first and second cut-outs 100a, 100b.

In other embodiments, the same gripping surface 202 of the end effector 200 may grip more than one cut-out 100 simultaneously. For instance, after removing one cut-out 100 (e.g., first cut-out 100a) from the sheet 104 of material, the position of the end effector 200 may be adjusted to locate the gripping surface 202 against the next cut-out 100 to be removed (e.g., second cut-out 100b). Additional vacuum zone(s) 206 of the gripping surface 202 may be activated to generate a vacuum on another section of the gripping surface 202 to grip the second cut-out 100b. The vacuum is maintained in the first vacuum zone(s) 206 to grip the first cut-out 100a as the same gripping surface 202 also grips the second cut-out 100b with the second vacuum zone(s) 206.

Referring still to FIG. 6, the method 600 also includes stacking the cut-outs 100 removed from the sheet 104 on top of one another in a stacking area 110, or multiple stacking areas 110, as shown at 612. For example, after removing one or more cut-outs 100 from the sheet 104 of material, the automated machine 102 may move the end effector 200 to a stacking area 110. More particularly, the end effector 200 may be positioned over a stacking surface 111 (FIG. 3) of the stacking area 110, e.g., if the cut-out 100 is the first cut-out to be positioned on the stacking surface, or the last cut-out 100 deposited in the stacking area 110. Then, the end effector 200 is lowered into contact with the surface 111 or the last cut-out 100, and the vacuum by which a cut-out 100 is gripped by a gripping surface 202 oriented toward the stacking area 100 may be released as described above to detach the cut-out 100 from the gripping surface 100. The contact between the end effector 200 and the surface on which the cut-out 100 is deposited helps prevent the cut-out 100 from shifting as it is released or after it has been released. In this way, a plurality of cut-outs 100 may be stacked one atop another in the stacking area 110. Of course, the end effector 200 may deposit a first plurality of cut-outs 100 in a first stacking area 110, a second plurality of cut-outs 100 in a second stacking area 100, etc. The processor 114 may include instructions for controlling in which stacking area 110 of a plurality of stacking areas 110 the end effector 200 deposits a particular cut-out 100.

In an exemplary embodiment, a plurality of plies 100 of a composite precursor material may be stacked in the stacking area 110 to form a ply layup, which may be processed to form a composite component. In such embodiments, the end effector 200 applies some force to the ply 100 as it releases the ply in order to position the ply on top of the last deposited ply 100. For example, the last deposited ply 100 may have a sticky surface, e.g., exposed by the removal of a backing layer of paper, film, or the like by the end effector 200 or other suitable device, and the end effector 200 must apply enough force to stick the ply 100 the end effector is currently gripping to the ply 100 last deposited in the stacking area 110. As such, the plies 100 undergo basic compaction from the force applied by the end effector 200 as the plies 100 are placed in the stacking area 110.

It will be appreciated that, if the end effector 200 is simultaneously gripping more than one cut-out or ply 100, the end effector 200 may consecutively stack each cut-out 100 in the stacking area 110. Further, the processor 114 may include instructions for controlling the end effector 200 such that the cut-outs 100 are stacked in a desired order. After the end effector 200 has released each cut-out 100 from their respective gripping surfaces 202, the end effector 200 may be returned to a location adjacent the sheet 104 of material to continue removing cut-outs 100 from the sheet 104, e.g., returning to 604 of method 600.

Accordingly, the present subject matter provides an end effector, an end effector system, and one or more methods for removing cut-outs or plies from a sheet of material that have one or more benefits or advantages. For example, the present subject matter provides an end effector that firmly holds one or more cut-outs flat against a gripping surface of the end effector. Further, the end effector has a plurality of gripping surfaces, each gripping surface having one or more vacuum zones, such that the end effector can pick up cut-outs of a variety of shapes and/sizes from a cutting table, thereby reducing or eliminating tool changes to pick up different cut-outs. Moreover, the end effector may transport more than one cut-out at a time to a stacking area, which, along with a reduction in tool changes, helps reduce the time to build a stack of cut-outs. Additionally, the cut-outs may be placed in a stack of cut-outs with a high degree of accuracy as to the position and orientation of the cut-outs because the end effector maintains or replicates the position and orientation of the cut-outs from the cutting table to the stacking area. That is, the end effector is configured to grip the cut-outs on one or more gripping surfaces such that the cut-outs may be deposited in the stacking area in the same position and orientation as the cut-outs were in when removed from the sheet of material on the cutting table.

Further, the end effector maintains a continuous vacuum on the cut-outs to prevent distortion of the cut-outs and shifting of the cut-outs with respect to the end effector, which increases the picking and placing accuracy of the end effector, i.e., the accuracy of the end effector in removing a cut-out from a sheet of material and depositing the cut-out in a suitable location. Still further, the end effector may grip and remove the cut-outs without picking up skeleton material with the cut-outs. In addition, the end effector may perform basic compaction of the cut-outs or plies as the end effector stacks the cut-outs or plies in the stacking area. Of course, other benefits and advantages also may be realized from the present subject matter.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. An end effector, comprising:
   a vacuum source;
   a plurality of gripping surfaces, each gripping surface including
      a plurality of vacuum zones, each vacuum zone having a non-smooth portion for distributing a vacuum, and
      a plurality of openings defined over the non-smooth portion for distributing the vacuum on the gripping surface using the vacuum source,
   wherein a shape and a number of vacuum zones varies among the plurality of gripping surfaces,
   wherein each non-smooth portion is an etched portion of each gripping surface,
   wherein the plurality of gripping surfaces is arranged in a polyhedron, and
   wherein the plurality of vacuum zones are configured to grip cut-outs having a plurality of shapes.

2. The end effector of claim 1, further comprising:
   a frame for holding the plurality of gripping surfaces in position with respect to one another.

3. The end effector of claim 1, wherein each gripping surface is substantially planar.

4. The end effector of claim 3, wherein each gripping surface is flexible to adapt to a contour of a surface against which the gripping surface is positioned.

5. The end effector of claim 1, wherein a seal extends around a perimeter of each vacuum zone.

6. The end effector of claim 1, wherein the end effector comprises at least four gripping surfaces.

7. The end effector of claim 1, wherein each vacuum zone is configured to be independently activated.

8. The end effector of claim 1, wherein the end effector is configured to simultaneously grip more than one cut-out.

9. The end effector of claim 1, wherein each of the plurality of cut-outs is a ply of a composite precursor material.

10. An end effector system, comprising:
    a cutting table on which a plurality of cut-outs is cut from a sheet of material;
    an automated machine; and an end effector attached to the automated machine, the
end effector having
- a vacuum source;
- a plurality of gripping surfaces, each gripping surface including
  - a plurality of vacuum zones, each vacuum zone having a non-smooth portion, and
  - a plurality of openings defined over the non-smooth portion for generating a vacuum on the gripping surface using the vacuum source,
wherein each gripping surface extends substantially within its own plane and each vacuum zone is substantially in the plane of the respective gripping surface,
wherein the plurality of gripping surfaces is arranged in a polyhedron,
wherein the end effector is configured to simultaneously grip a first cut-out on a first gripping surface of the plurality of gripping surfaces and a second cut-out on a second gripping surface of the plurality of gripping surfaces, and
wherein the plurality of vacuum zones are configured to grip cut-outs having a plurality of shapes to remove the cut-outs from the sheet of material.

11. The end effector system of claim 10, further comprising:
- a vacuum sensor for detecting a vacuum level of the vacuum source; and
- a vacuum control unit for controlling the vacuum level of the vacuum source.

12. The end effector system of claim 10, wherein the automated machine comprises a processor for controlling a position of the end effector, wherein the processor is configured for controlling which gripping surface of the plurality of gripping surfaces is oriented toward the cutting table.

13. The end effector system of claim 10, wherein each non-smooth portion is an etched portion of each gripping surface.

14. A method for removing a cut-out from a sheet of material using an end effector having a plurality of gripping surfaces, the method comprising:
- orienting the end effector such that one gripping surface of the plurality of gripping surfaces is oriented toward the cut-out;
- bringing the one gripping surface oriented toward the cut-out into contact with the cut-out in the sheet of material;
- generating a vacuum on the one gripping surface with at least one vacuum zone of the one gripping surface to grip the cut-out; and
- removing the cut-out from the sheet of material,
wherein each gripping surface includes a plurality of vacuum zones, each vacuum zone having a non-smooth portion,
wherein each gripping surface extends substantially within a plane and each vacuum zone is substantially in the plane of the respective gripping surface, and
wherein a plurality of openings is defined over the non-smooth portion for generating the vacuum on the gripping surface.

15. The method of claim 14, further comprising:
cutting a plurality of cut-outs from the sheet of material, the cut-outs having a plurality of configurations.

16. The method of claim 14, further comprising:
stacking the cut-outs on top of one another in a stacking area.

17. The method of claim 14, wherein the end effector is attached to an automated machine, the automated machine comprising a processor for controlling the end effector.

18. The method of claim 14, further comprising, after removing the cut-out from the sheet of material, where the cut-out is a first cut-out:
- orienting the end effector such that a second gripping surface of the plurality of gripping surfaces is oriented toward a second cut-out;
- bringing the second gripping surface oriented toward the second cut-out into contact with the second cut-out in the sheet of material;
- generating a vacuum on the second gripping surface with at least one vacuum zone of the second gripping surface to grip the second cut-out;
- maintaining the vacuum on the first cut-out such that the end effector grips at least two cut-outs simultaneously; and
- removing the second cut-out from the sheet of material,
wherein the at least two cut-outs are consecutively stacked on top of one another in a stacking area.

* * * * *